United States Patent [19]

Fateley

[11] Patent Number: 4,799,795
[45] Date of Patent: * Jan. 24, 1989

[54] STATIONARY, ELECTRICALLY ALTERABLE, OPTICAL MASKING DEVICE AND SPECTROSCOPIC APPARATUS EMPLOYING SAME

[75] Inventor: William G. Fateley, Manhattan, Kans.

[73] Assignee: D.O.M. Associates, Inc., Manhattan, Kans.

[*] Notice: The portion of the term of this patent subsequent to Oct. 7, 2003 has been disclaimed.

[21] Appl. No.: 115,639

[22] Filed: Oct. 26, 1987

Related U.S. Application Data

[63] Continuation of Ser. No. 902,575, Sep. 2, 1986, abandoned, which is a continuation of Ser. No. 613,711, May 24, 1984, Pat. No. 4,615,619, which is a continuation-in-part of Ser. No. 590,999, Mar. 19, 1984, abandoned.

[51] Int. Cl.$^4$ ............................ G01F 1/01; G01J 3/28
[52] U.S. Cl. ..................................... 356/310; 356/330
[58] Field of Search ................ 356/310, 330; 350/353, 350/355, 359, 363

[56] References Cited

U.S. PATENT DOCUMENTS

| | | | |
|---|---|---|---|
| 4,193,691 | 3/1980 | Fjarlie | 356/330 |
| 4,283,113 | 8/1981 | Eden | 350/353 |
| 4,615,619 | 10/1986 | Fateley | 350/353 |

FOREIGN PATENT DOCUMENTS 0075171 3/1983 European Pat. Off. ............ 356/320

OTHER PUBLICATIONS

Decker, Jr., *Analytical Chemistry*, vol. 44, No. 2, Feb. 1972, pp. 127A–130A, 132A–134A.

*Primary Examiner*—F. L. Evans
*Attorney, Agent, or Firm*—Hovey, Williams, Timmons & Collins

[57] ABSTRACT

An improved masking device for optical-type radiations is provided and employed in improved optical apparatus, such as spectrometers, requiring alterable radiation masking. The masking device involves no movable parts, is adapted to operate in a fixed position and has radiation transmission and/or reflection characteristics which are selectively alterable merely by controlling electrical excitation applied to the device. The masking device typically has a plurality of separated and predisposedly offset, coplanar zones of solidified, electro-optically active material carried upon a typically transparent substrate and bounded by areas of an opaque material. The active material may be any of the crystalline or polycrystalline materials which have the property of changing their optical characteristic between being relatively transmissive and being relatively reflective and/or opaque for radiations of the wavelengths of interest, in response to the passage of electrical current through the material. Alteration of the optical masking pattern configuration of the masking device under electrical control is sufficiently rapid to accommodate to computerized optical apparatus, such as infrared spectroscopic systems utilizing Hadamard transforms or analogous mathematical techniques.

10 Claims, 3 Drawing Sheets

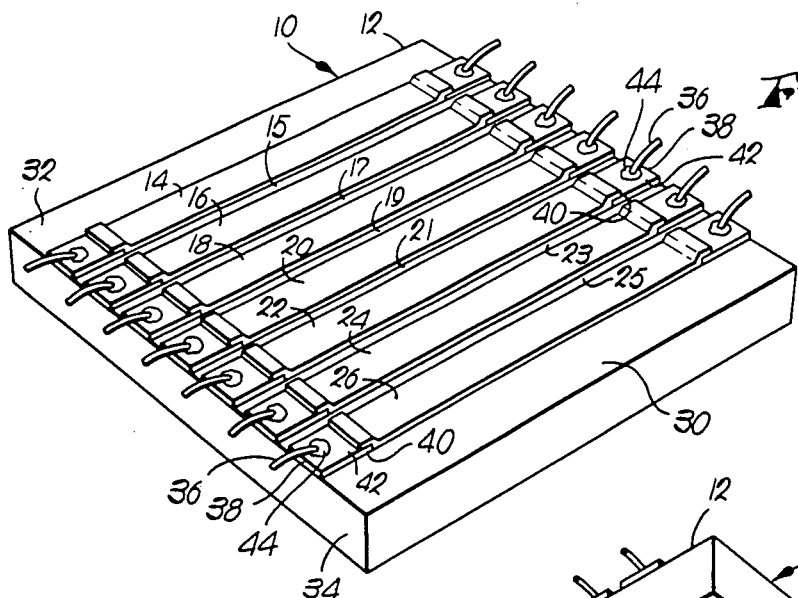

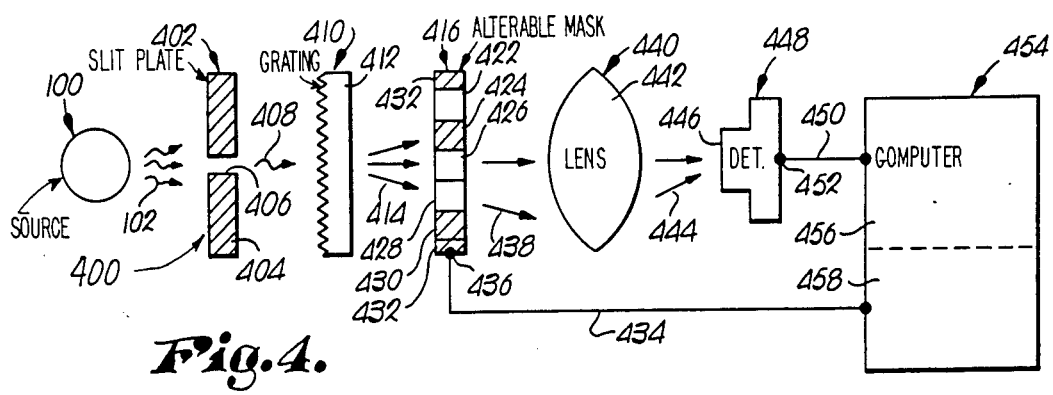
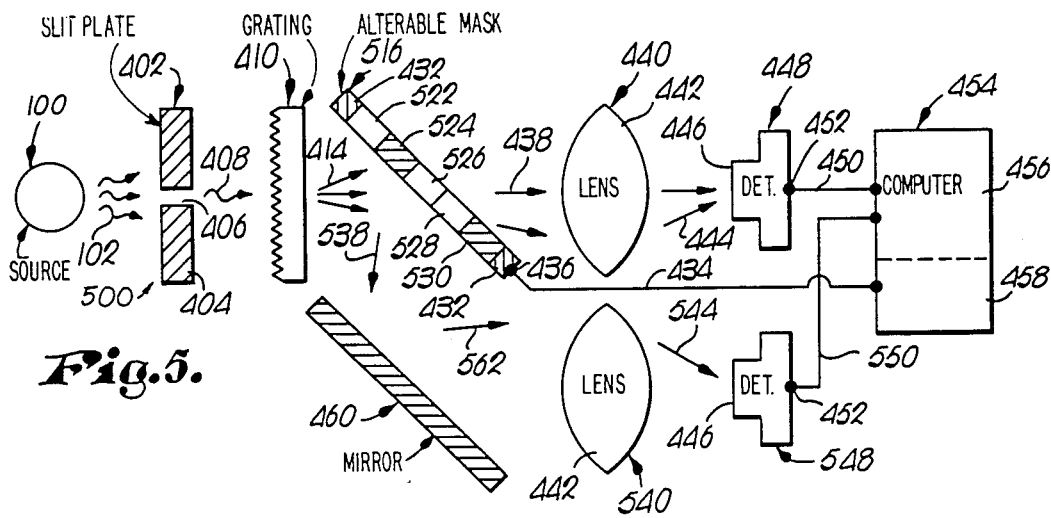
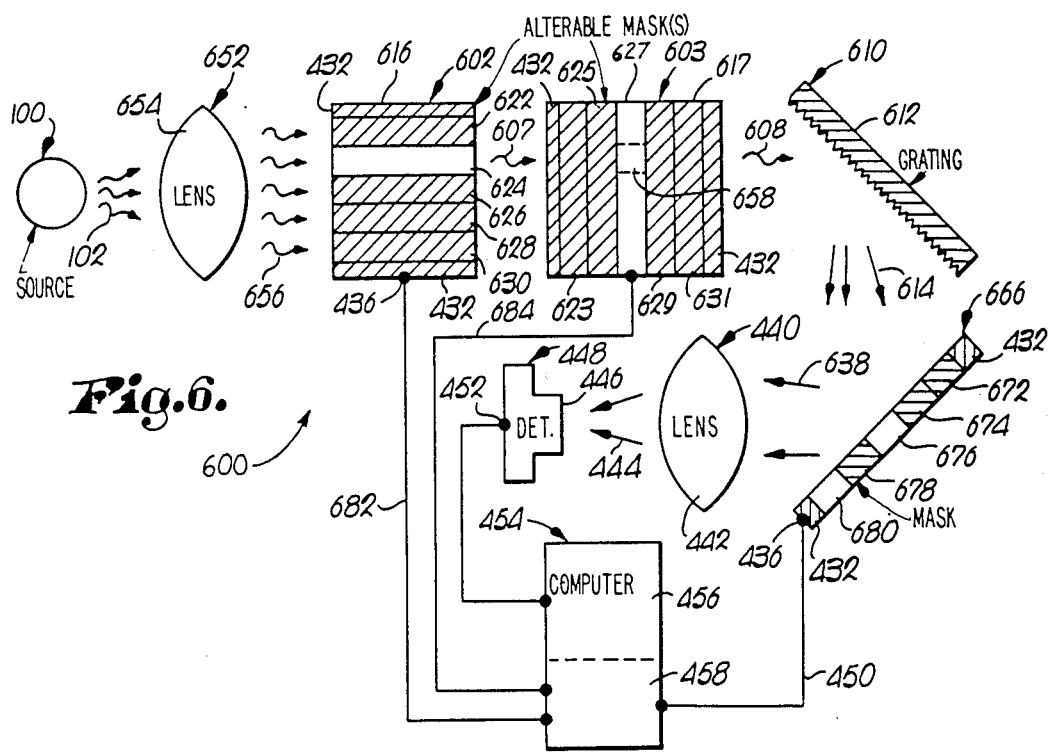

STATIONARY, ELECTRICALLY ALTERABLE, OPTICAL MASKING DEVICE AND SPECTROSCOPIC APPARATUS EMPLOYING SAME

This application is a continuation of application Ser. No. 902,575, filed Sept. 2, 1986, now abandoned, which was a continuation of Ser. No. 613,711, filed May 24, 1984, now U.S. Pat. No. 4,615,619, which was a continuation-in-part of Ser. No. 590,999, filed Mar. 19, 1984, now abandoned.

BACKGROUND OF THE INVENTION a. Field of the Invention

This invention relates to the field of optics and, more particularly, to improvements in instrumentation for use in that field. Still more specifically, this invention pertains to instrumentation adapted for use with what will be referred to as "optical-type" radiations (i.e., infrared, visible and ultraviolet radiations of wavelengths conforming to the laws of optics relating to transmission, reflection and refraction) and concomitantly provides, first, an improved kind of optical masking device having masking characteristics (in terms of transmissivity versus reflectivity and/or opacity) that are selectively and quickly alterable under electrical control while the masking component and all parts of the latter remain fixed in a stationary position, and, secondly, improved optical apparatus employing such masking devices as components thereof for a variety of possible applications. One exemplary application for the invention, for which there is an immediate and substantial need, and with respect to which the invention is hereinafter primarily disclosed for illustration, is in connection with computerized, infrared spectroscopic systems utilizing Hadamard transforms or analogous mathematical techniques for spectral analysis.

b. General Background Prior Art

Conventional devices employed as components in instrumentation for manipulating, analyzing or responding to optical-type radiations include planar mirrors for changing the direction of travel of such radiations, curved mirrors for both collimating or focusing and changing the direction of travel of such radiations, partially "silvered" mirrors for splitting a beam of such radiations into a pair of beams travelling in different directions, lenses for collimating or focusing such radiations, prisms for separating and dispersing such radiations into components corresponding to the wavelengths present in the radiations with the direction of travel of each component being differently displaced, reflective or transmissive diffraction gratings for the same general purpose as prisms and also changing the general direction of travel of the dispersed components when the dispersive element is reflective, various kinds of "photoelectric" sensors for detecting such radiations and responding to the intensity thereof either by producing a corresponding electrical output or a corresponding change in the value of an internal electrical impedance of the sensor, various combinations of the foregoing, etc. Although it is to be understood that apparatus embodying this invention may appropriately employ any of such conventional optical devices as system components, no claim is herein made to any of such components per se.

Another type of device conventionally employed in various types of apparatus for use in connection with optical-type radiations is commonly referred to as a "mask". The purpose of such masks is to permit the passage, by transmission or reflection, of one or more selected cross-sectional portions of such radiations (or one or more mutually displaced wavelength components thereof), while blocking the passage of other portions (or components) of such radiations. A typical mask of the transmission type utilizes one or more apertures or transparent zones in an otherwise opaque plate or the like, and a typical mask of the reflective type utilizes one or more mirrored or reflective zones upon an otherwise transmissive (or opaque and relatively non-reflective) plate or the like. A simple example is the beam restricting "entrance mask" having a single slit in an opaque plate, as commonly employed in many spectrometers. It is also known practice to utilize more than one masking component in succession along the path of travel of optical-type radiations (for example, successive masking components each having a respectively perpendicular, elongate, rectangular aperture or reflective zone may be employed to provide passage for a square cross-sectional portion of such radiations.) More recently, the advent of using mathematical techniques such as Hadamard transforms in spectroscopic analysis systems has brought into common usage a type of mask having a plurality of transmissive or reflective zones (typically a number of parallel, rectangular zones spaced from each other in some predetermined arrangement in which they occupy only a portion of the overall area of the mask) for passing a corresponding group of mutually displaced wavelength components of optical-type radiations, the particular group of components passed being dependent upon the precise positioning of such a mask relative to the paths of the radiation components. Again, apparatus embodying this invention may appropriately utilize the foregoing types of conventional masks (for example, as an entrance mask), but no claim is made to any of those general types of masks per se (i.e., apart from the construction thereof with respect to permitting the masking zone pattern to be "altered" under electrical control).

c. Hadamard Transform Mathematical Technique of Analysis

In very general terms, the Hadamard transform mathematical technique of analysis is applicable to situations involving a plurality of distinguishable quantities, each of which may exist in some unknown magnitude or may be absent, in which it is desired to accurately determine the existence and magnitude of each quantity which exists under circumstances rendering it more feasible or expedient to accurately determine the aggregate magnitude of various subset groups of such quantities than to determine the existence and magnitude of each quantity individually (for example, when the number of quantities is very large). In such situations, the Hadamard technique (and analogous variations thereof) essentially employs matrix transforms to solve a set of simultaneous equations in which the coefficients for each equation are based upon measurements of the aggregate magnitude of a different subset group of the possible quantities. As applied to spectroscopic analysis of the presence and intensity (or amount of energy) of "spectral element" components of different wavelengths (typically, relatively narrow spectral bands of radiation each constituting a small interval of the wavelength spectrum) in optical-type radiations from a source of the latter, wherein the ability to separate and accurately measure the intensities of individual wavelength components directly is inherently limited by the resolution capabilities of the wavelength component dispersing element, the sensitivity of the detecting and measuring element and other factors, the Hadamard technique permits data derived from a plurality of measurements of the aggregate intensity of differing subset groups of the possible wavelength components which may be present to provide accurate results concerning the presence and intensity or absence of each wavelength component within a spectrum range of interest. The Hadamard technique or/and its application to spectroscopic analysis, including the nature and number of mask patterns needed for analysis of a given spectral range and further details of the involved computations, are more fully and formally discussed in the literature; for example, see: the chapter entitled "Hadamard Transform Spectroscopy" by W. G. Fateley, et al. at pages 89-118 of the book "Analytical Applications of FT-IR to Molecular and Biological Systems" edited by J. R. Durig and published by D. Reidel Publ. Co. in 1980, the book "Hadamard Transform Optics" by Martin Harwit, et al. published by Academic Press, Inc. in 1979, the chapter entitled "Hadamard Transform Analytical Systems" by Martin Harwit at pages 173-197 of the book "Transform Techniques in Chemistry" edited by P. R. Griffiths and published by Plenum Press in 1978, the article entitled "Fourier and Hadamard Transform Methods in Spectroscopy" by A. G. Marshall, et al. at pages 491A-504A of the journal "Analytical Chemistry", Vol. 47, No. 4, April 1975, the article entitled "Hadamard-Transform Image Scanning" by J. A. Decker, Jr. at pages 1392-1395 of the journal "Applied Optics", Vol. 9, No. 6, June 1970, and the article entitled "Hadamard Transform Image Coding" by W. K. Pratt, et al. at pages 58-68 of the journal "Proceedings of the IEEE", Vol. 57, No. 1, Jan. 1969. Recent U.S. Patents relating to the use of Hadamard transform techniques, which discuss the type of computations involved or specific apparatus for making the same, although relating primarily to the image recognition field or to the computational apparatus itself, include Despois, et al. U.S. Pat. No. 4,389,673, Lux No. 4,134,134, Joynson, et al. U.S. Pat. No. 3,982,227, McGlaughlin U.S. Pat. No. No. 3,969,699, Radcliffe U.S. Pat. No. 3,859,515 and Muenchhausen U.S. Pat. No. 3,815,090. The algorithmic and computational aspects of employing Hadamard transform techniques in various applications are now well known and are not per see claimed herein. It is also recognized that the use of appropriately programmed electronic computers is now generally regarded as the most convenient and preferred method of performing the computations involved in the Hadamard technique.

d. Prior Masking Devices

As previously noted, made clear in the mentioned literature and also indicated by the Decker U.S. Pat. No. 3,578,980, the conventional and commonly accepted form of optical masking devices has long involved plate-like elements having one or more fixed transmissive or reflective zones. Such masking devices are quite satisfactory in applications in which the masking configuration need not be altered. However, in applications in which it is essential that the masking configuration be altered (such as in spectroscopy employing Hadamard transform or analogous techniques), it has heretofore been necessary either to successively substitute differently configured masking components or to provide mechanical means for readjusting the location of a single masking component, in both cases giving due attention to ensuring that the substituted or shifted mask is relocated with the utmost precision. These considerations and the resultant high cost of both equipment and time required for utilization, as well as the possibly deleterious effect upon accuracy of any imprecision of manual emplacement or mechanical adjustment of the masking component(s), has stood as a significant impediment to the construction and use of practical spectrometers and other apparatus for dealing with optical-type radiations in a manner to realize the acknowledged potential benefits of Hadamard transforms or analogous mathematical techniques of measurement and analysis.

With regard to previous device, which may be of some background interest in relation to the specific nature and construction of the improved masking device provided by this invention, the Wajda U.S. Pat. No. 4,007,989 recognizes the existence of the same problems arising from movable masking components as addressed by this invention and discloses a "filter" for use in Hadamard transform spectrometers that has no moving parts, but employs an element provided with multiple "fly's-eye" lenses for respectively focusing radiation components of differing wavelengths upon corresponding ones of an associated array of photodiode detectors in conjunction with electrically switched scanning of the electrical outputs from the detectors. Certain ones of the lenses in the Wajda device are "rendered opaque" in an unspecified but apparently fixed manner to present a Hadamard technique compatible pattern. However, although the overall device is referred to as a "Hadamard mask", only a single, unalterable pattern of optical radiation masking is provided, and appropriate electrical scanning of the multiple detectors is relied upon for implementing a Hadamard transform technique. No suggestion is found in the Wajda disclosure of an alterable mask for optical-type radiations or how such a device might be provided.

Other prior U.S. Patents of possible background interest are the Torok U.S. Pat. No. 3,861,784, which employs magnetic stripe domain technology to provide electrically controllable equivalents of a diffraction grating, a Fresnel lens or the like, and the Fleisher U.S. Pat. No. 3,402,001, which provides a Fresnel lens equivalent for monochromatic, polarized light from a laser by means of an electric potential applied between concentric, annular electrodes on opposite sides of a plate of material adapted to have its optical transmissive properties polarized by the electrical field applied across its thickness, and the Buhrer U.S. Pat. No. 3,813,142, which also provides a diffraction grating equivalent by applying an electrical field between electrodes associated with an intervening film of material whose optical index of refraction is changed by the field.

Since the mask provided by this invention employs a film of diachromic crystalline or polycrystalline material, such as vanadium dioxide, it should also be noted that a number of researchers have investigated and reported upon the inherent chemical, crystalline, optical, electrical and other physical properties of both vanadium dioxide and thermodiachromic or electrodiachromic optical, effects when the material is stimulated by heat or the flow of electrical current therethrough to traverse its semiconductor-metal transition level (or the similar effects exhibited by some organometallic complex compounds). Although no prior suggestion of the application of such properties of such materials for implementing alterable masking devices of the kind provided by this invention is known, the information provided by such research reports concerning specific parameters of particular properties may be useful to persons following this invention in selecting among available materials and otherwise designing masking devices in accordance with this invention which will be optimized for particular wavelength regions of the opticaltype radiation spectrum or for specialized applications or environments. Accordingly, the following papers ae noted and identified: "Infrared Optical Properties of $VO_2$ Above and Below the Transition Temperature", Barket et al., Phys. Rev. Lett., Vol. 17, No. 26; "Electronic Properties of $VO_2$ Near the Semiconductor-Metal Transition", Berglund et al., Physical Rev., Vol. 185, No. 3; "High-Speed Solid-State Thermal Switches Based on Vanadium Dioxide", Cope et al., Brit. J. Appl. Phys., 1968, Vol. 1, Sec. 2; "Filamentary Conduction in $VO_2$ Coplanar Thin-Film Device", Duchene et al., Appl. Phys. Lett., Vol. 19, No. 4; "Optical Properties of $VO_2$ Between 0.25 and 5eV", Verleur et al., Phys. Rev., Vol. 172, No. 3; "Optical Storage in $VO_2$ Films", Smith et al., Appl. Phys. Lett., Vol. 23, No. 8; "Semiconductor-to-Metal Transitions in Transition-Metal Compounds", Adler et al., Phys. Rev., Vol. 155, No. 3; "Two Switching Devices Utilizing $VO_2$", Walden et al., "IEEE Transactions on Electron Devices", Vol. ED-17, No. 8; "Change in the Optical Properties of Vanadium Dioxide at the Semiconductor-Metal Phase Transition", Mokerov et al., Sov. Phys. Solid State, Vol. 18, No. 7; "Features of the Optical Properties of Vanadium Dioxide Films Near the Semiconductor-Metal Phase Transition", Gerbshtein et al., Sov. Phys. Solid State, Vol. 18, No. 2; "Influence of Stoichiometry on the Metal-Semiconductor Transition in Vanadium Dioxide", Griffiths et al., J. Appl. Phys., Vol. 45, No. 5; and "Semiconductor-to-Metal Transition in $V_2O_3$", Phys. Rev., Mar. 15, 1967. With regard to methods for making thin films of vanadium dioxide, also see: "Reactivity Sputtered Vanadium Dioxide Thin Films", Fuls, et al., Appl. Phys. Lett., Vol. 10, No. 7; and "Preparation of $VO_2$ Thin Film and its Direct Optical Bit Recording Characteristics", Fukuma et al., Appl. Optics, Vol. 22, No. 2.

SUMMARY OF THE INVENTION

The invention is dual faceted and concomitantly involves a novel and improved kind of electrically controllable, selectively alterable, masking device for optical-type radiations, whose masking pattern configuration can be altered without physical movement or mechanical adjustment of the positioning of the masking device, and a novel and improved kind of spectroscopic apparatus for such radiations, which is particularly adapted for utilizing Hadamard transform techniques and employs a combination of elements and relationships therebetween including the improved masking device and electrical means for controlling the same, eliminating the masking component mechanical repositioning means required by conventional prior apparatus for similar purposes, and achieving new and improved results for such class of apparatus in terms of full electrical control over the masking pattern altering and computational functions involved in Hadamard transform spectroscopy with attendant substantial improvment in speed, accuracy and convenience of operation.

The currently preferred masking device has elongate, longitudinally parallel, rectangular masking zones and can be employed either singly to provide, for example, selection between different numbers or arrangements of parallel rectangular zones of transmission, reflection or blocking of optical-type radiations, or can be employed in pairs to provide similar functions with respect to square or rectangular masking zones disposed as cells of a two-dimensional grid or matrix. Pairs of the devices may also be employed with one operating in a radiation transmission mode and the other operating in a radiation reflecting mode. Disclosed alternate constructions include individual masking devices directly providing a two-dimensional grid of square masking zones and masking devices providing perpendicular sets of elongate masking zones in an unitary structure.

The currently preferred construction for the masking device employs a thin supporting substrate plate of material that is electrically insulative and relatively transmissive for radiations of the wavelengths of interest, such as sapphire (although high purity silicon or certain other materials may be used), having a plurality of side by side, separated but closely spaced, rectangular strips mounted upon one face of the substrate and formed as a thin layer or film of a diachromic, such as vanadium dioxide (although certain other semiconductor-transition metal or organometallic complex compounds exhibiting diachromic properties in response to the electrical or/and thermal effects of passage of an electrical current therethrough can be used), together with suitable means for effecting electrical connections with each strip adjacent its opposite extremities for selectively applying an electrical potential to cause a flow of electrical current through the strip. The preferred diachromic materials for forming the strips all are relatively transmissive for optical-type radiations in the absence of electrical current flowing therethrough, but become relatively opaque or/and reflective in response to the flow of electrical current therethrough. The times required for transition between the transmissive and opaque-reflective states of the diachromic materials in either direction upon application or removal of electrical exitation thereto, are very rapid and compatible with computerized control over the selective alteration of masking patterns.

The spectroscopic apparatus broadly employs as interrelated components optional means of conventional nature, such as a lens or curved mirror, for collimating optical-type radiations from a source of the latter into a beam of substantially parallel rays each including radiations of whatever wavelengths may be received from the source; entrance mask means, such as a conventional fixed or mechanically shiftable slit plate or either one or a pair of the positionally fixed, electrically alterable masking devices provided by this invention, for restricting the crosssectional extent and shape of the beam received from the collimating means (or from the source, if no collimating means is employed) and, if either an electrically alterable masking means or a mechanically shiftable slit plate is used, also restricting such beam with respect to selectable portions of the radiations received; dispersing means, such as a conventional diffraction grating or prism, for separating the beam received from the entrance restricting means into dispersed spectral element components angularly displaced from each other and each predominantly including radiations of only a corresponding wavelength (or very narrow range thereof); fixedly positioned, electrically alterable, masking means in the form of one or a pair of the masking devices provided by the invention for receiving the dispersed, wavelength component radiations from the separating means and selectively passing, by transmission or reflection, only those radiation components for spectral elements of particular wavelengths; means, such as a conventional lens or curved mirror, for focusing wavelength component radiations passed by the masking means; means, such as any of a variety of conventional photoelectric transducing components, for receiving the wavelength component radiations passed by the masking means and focused by the focusing means and detecting the aggregate intensity thereof and converting the latter into an electrical signal or parameter of corresponding magnitude; and means, preferably (although not necessarily) in the form of an appropriately programmed computer system including suitable control means, data input interfacing means, data storage means, computational means, output interfacing means, peripheral output presentation means, and mask altering output signal driver means and the like, suitably coupled electrically with the detecting means and each electrically alterable masking means employed in the apparatus, for performing the dual functions of utilizing radiation intensity data from the detecting means to provide desired information to the peripheral output presenting means after any desired data processing (such as for implementing Hadamard transform techniques) has been done and to selectively alter the masking patterns of the masking devices employed in the apparatus at times and in manner appropriate the desired spectroscopic analysis being performed. The apparatus may conventionally include additional elements, such as mirrors, for diverting the paths of radiations or wavelength components thereof to accommodate to constructional preferences for particular applications, and a high degree of freedom of choice between equivalent transmissive or reflective components is also available in constructing the apparatus for similar purposes or to satisfy user preferences. Besides the aforementioned advantages of the apparatus with respect to speed, accuracy and convenience, other benefits include its versatility and its adaptability for possible use in remote and adverse environments, such as in sattelites or other surveillance or surveying craft, by virtue of its elimination of moving parts and its suitability for full electrical control of its functions by a computer.

DESCRIPTION OF THE DRAWINGS

FIG. 1 is a perspective view from above of the currently preferred construction for one form of improved masking device provided by this invention, which employs elongate, parallel masking strips on one face of a supporting substrate (dimensioned for clarity of illustration, rather than being to scale);

FIG. 2 is a diagramatic depiction of the active major face of a modified form of the masking component of the invention employing square masking zone structures disposed in a grid arrangement to provide one type of matrix-like two-dimensional masking control;

FIG. 3 is a perspective view from below of another modified form of the masking component of the invention employing masking strips similar to those depicted in FIG. 1, but disposed upon opposite faces of a common substrate and oriented perpendicularly to each other to provide another type of X-axis and Y-axis, two-dimensional masking control (dimensioned for clarity of illustration, rather than being to scale);

FIG. 4 is a schematic diagram depicting one currently preferred embodiment of spectroscopic apparatus according to this invention;

FIGS. 5 and 6 are schematic diagrams depicting illustrative modified embodiments of spectroscopic apparatus according to this invention;

FIG. 7 is a schematic diagram depicting the manner in which one of the improved masking devices provided by this invention may be employed in its transmissive mode in conjunction with and between a pair of angularly displaced mirrors in spectroscopic apparatus according to this invention;

FIG. 8 is a fragmentary schematic diagram depicting the active major face of the masking device depicted as from an end thereof in Fig. 7;

FIG. 9 is a schematic diagram depicting the manner in which one of the improved masking devices provided by this invention may be employed in its reflective mode in an angularly displaced orientation to a mirror in spectroscopic apparatus according to this invention;

DESCRIPTION OF THE PREFERRED EMBODIMENTS

Figure 10:
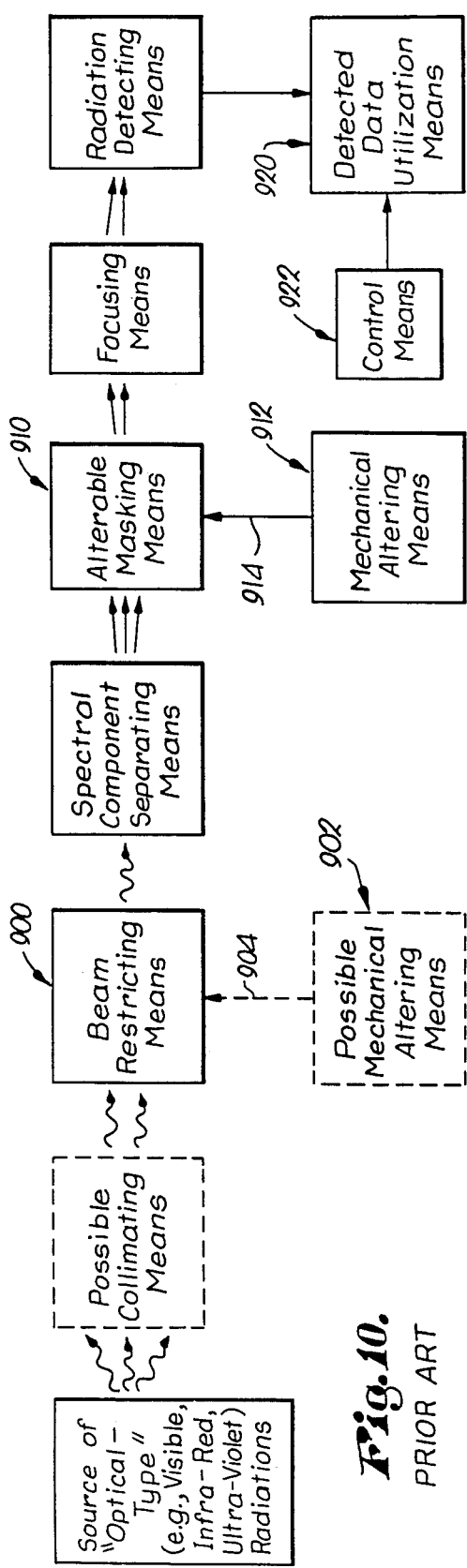
FIG. 10 is a block diagram broadly indicating the combinational elements and relationships involved in prior spectroscopic apparatus.

That aspect of this invention relating to the improved, electrically alterable, masking device will first be considered, with initial reference to the currently preferred, single mask embodiment to which FIGS. 1 and 2 are directed. It is reiterated that such drawings are not to scale and are intended primarily to indicate the nature and relationship of parts.

The device is generally identified with the reference numeral 10 and will be observed to include a plate-like substrate 12 upon one major face 30 of which a plurality of strip-like masking zone structures 14, 16, 18, 20, 22, 24 and 26 are carried.

The substrate 12 is shown for illustration as rectangular and approximately square, but can be of any shape appropriate to the cross-sectional nature of the beam of radiations to be masked and suitable for facilitating fixed mounting of the device 10 in spectroscopic or other apparatus in which it is to be employed. The edge to edge dimensions of the substrate 12 will vary with the application from less than an inch to several inches, but its thickness will generally be as small as considerations of physical integrity in the intended environment of use will permit. The substrate 12 is essentially an inactive element of the device 10, except for its functions in supporting the structures 14 et seq. and possible means hereinafter described for effecting electrical connections with each of the structures 14 et seq. adjacent the opposite ends thereof. The substrate 12 should, however, be formed of a rigid material that is physically stable, is electrically insulative, has low thermal conductivity and is highly transmissive to optical-type radiations of the wavelengths of interest in connection with the intended use of the device 10. It is also important, of course, that the material of which the substrate 12 is formed be adapted to receive and hold a thin layer or film of the material from which the structures 14 et seq. are formed without chemical or significant electrical interaction therebetween. The currently preferred material for forming the substrate 12 is sapphire, although very high purity silicon and various other materials satisfying the mentioned criteria may be used and might be desirable in particular applications or environments.

The structures 14 et seq., which provide the electrically alterable, active masking elements of the device 10, preferably occupy a central area of the face 30 of the substrate 12. In the illustrated embodiment, the structures 14 et seq. are in the shape of elongate rectangles, disposed in side-by-side parallelism and separated by very narrow slots or spaces 15, 17, 19, 21 and 25 therebetween. Typical widths for the structures 14 et seq. are in the range of about 0.025 inch to about 0.038 inch, and typical widths for the intervening slots 15 et seq. therebetween are in the range of about 0.004 inch to about 0.006 inch, although the width of the structures 14 et seq. may be varied to accommodate to the desired masking pattern and the widths of the slots 15 et seq. may need to be somewhat greater than mentioned depending upon the manner in which the device 10 is fabricated. The structures 14 et seq. are preferably not more than a few thousandths of an inch thick.

The structures 14 et seq. are formed as very thin layers or films of a selected diachromic, crystalline or polycrystalline material adhered to the face 30 of the substrate 12. The currently preferred method of fabrication involves depositing the diachromic material over the entire central area of the face 30 of the substrate 12 by evaporative sputtering and oxidation in known manner, then separating the individual structures 14 et seq. and forming the slots 15 et seq. therebetween by cutting the deposited diachromic layer at the proper intervals therealong with a very fine diamond saw. As indicated in the illustrated construction for the device 10, it is desirable to confine the structures 14 et seq. defining the zones of electrically alterable masking to an area of the substrate 12 which leaves marginal portions of the substrate 12 as at 32 and 34 available for use in fixedly mounting the device 10 in spectroscopic apparatus or the like. In their electrically deenergized state (i.e., without an electrical current flowing therethrough), the masking film structures will be relatively transmissive to optical-type radiations and then become opaque and relatively reflective to such radiations when an electrical current is caused to flow therethrough. It is desirable, however, that the spaces 15 et seq. between the masking structures 14 et seq. be and remain essentially opaque to the radiations for which the masking device 10 is being used. This may be accomplished as an incident of the fabrication of the device 10 in connection with cutting the slots 15 et seq. through the diachromic layer, by arranging that such cuts will be sufficiently deep to abrade the portions of the face 30 of the substrate 12 underlying the slots 15 et seq. to render the same substantially opaque to radiations of the wavelengths of interest or the slots 15 et seq. may simply be filled or covered with any suitable opaque material, such as carbon black suitably bonded in place.

As previously mentioned, it is necessary to provide some suitable means for effecting electrical connections with each of the masking structures 14 et seq. adjacent each end of the latter, in order that an electrical current selectively may be caused to flow through any one or more of the structures 14 et seq. This may be conventionally accomplished in a number of ways, including conductive electrical leads provided with suitable spring contact clamps for conductively engaging the end portions of the structure 14 et seq., with the clamps being retained in positional relationships for proper alignment and engagement with a corresponding end portion of all of the structures 14 et seq. in the general manner commonly employed to effect connections with various electronic components and assemblies provided with rows of electrical contact surfaces adjacent the edges thereof. However, in the construction illustrated in FIG. 1, techniques that have been employed in effecting electrical connections with the thin metallic electrode films on miniature piezoelectric crystals is utilized, wherein thin conductive lead wires as at 36 are silver soldered directly to a conductive metal film. With this method of fabrication of the device 10, the central area of the face 30 of the substrate 12 to be occupied by the diachromic masking structures 14 et seq. is conventionally covered with a physical masking material, and a thin layer of electrically conductive metal, such as silver or the like used for piezoelectric crystal electrodes, is deposited by sputtering or other conventional techniques upon at least the marginal portions of the face 30 of the substrate 12 along the edges of the latter at which electrical connections are to be effected with the end portions of the masking structures 14 et seq. (and, if desired, the marginal portions at the other two ends of the face 30 may also be covered with the deposited metallic material to render them opaque); then, the physical masking material may be removed from the central portion of the face 30 and such material applied over an outer portion of the marginal metallic layer, followed by deposit of the film or layer of diachromic material over the central portion of the face 30 and an inner portion of the previously deposited marginal metallic layer; and finally the aforementioned cuts may be made at appropriate intervals along the face 30 to not only separate the masking structures 14 et seq. with the slots 15 et seq., but also at the same time to separate the marginal metallic layer by extension of the slots 15 et seq. into rows of electrically conductive contacts as at 38 partially underlying and in electrically conductive relationship with the end portions of the corresponding masking structures 14 et seq. as at 40 and to provide exposed contact surfaces as at 42 which, after removal of the physical masking material therefrom, can either be utilized for engagement with clamping type contacts (with lesser risk of damage to the masking structures 14 et seq. than when the latter are directly engaged by clamps) or can be employed for receiving leads 36 soldered thereto as at 44.

The type of details of construction and fabrication just above discussed are amenable to various choices among known manufacturing processes and techniques and are mentioned merely for the sake of completeness, rather than being regarded as critical to the invention. What does significantly need to be further considered in connection with the device 10, however, is the nature of the material to be employed for the masking film structures 14 et seq. and, insofar as present information will permit, the manner in which they are understood to operate.

The property of certain crystalline and polycrystalline materials to exhibit a diachromic effect when heated above a "transition level" associated with each such material has been of interest to physical chemists and has been widely investigated and reported. The effect is most commonly associated with certain so-called "transition metal" compounds and is manifested by a change from a semiconductor state below the transition level to a metallic state above the transition level, accompanied by an observed corresponding change in optical characteristics from a relatively transmissive state for optical-type radiations below the transition level to a substantially opaque and relatively reflective state above the transition level. A similar effect has been observed with certain organometallic complex compounds, when subjected to appropriate electrical stimulus. With the transition metal compounds, the effect appears to be largely thermodiachromically stimulated, while the analogous effect with organometallic complex compounds appears to be more of electrodiachromic nature.

The material which I have tested and currently prefer for forming the masking film structures 14 et seq. is the transition metal compound vanadium dioxide. Strip-like masking films of vanadium dioxide of the order of dimensions previously mentioned, when stimulated by the passage of an electrical current of a few microamperes therethrough by the application thereacross of a direct current potential of approximately 200 volts, are quickly heated from ambient temperature to above the transition level for such material and exhibit the transition effect by changing from a relatively transmissive state for optical-type radiations (in excess of 55% transmission for radiations of 3800 $cm^{-1}$ wavelength) to relatively opaque (less than 5% transmission for the same radiations) and effectively reflective. Moreover upon cessation of such electrical current flow, the state reversal occurs with comparable rapidity. It appears that the heating of the structures 14 et seq. to a temperature above the transition level utilized in the invention for inducing the change of optical properties of such masking zones from a transmissive state to an opaque-reflective state is primarily attributable to the "resistance heating" effect upon the film material caused by the flow of an electrical current therethrough, as contrasted with being produced by any external electrostatic field or the like, and that the time required for such transition to occur after application of an electrical potential across any of the structures 14 et seq. is, therefore, dependent not only upon the magnitude of the applied potential, but also upon the cross-section of the structure through which the current will flow. Similarly, the time required for cooling of any of the structures 14 et seq. that has previously been heated back to a temperature below the transition level for restoring the transmissive state of such structure is dependent upon the thickness of the structure. Although response times, in both directions, are thus decreased as the thickness of the structures 14 et seq. is decreased, it will be appreciated that some element of compromise is involved in specific design to accommodate to considerations of physical integrity of the structures with currently available fabrication techniques, the electrical potential to be employed, etc. In any event, typical response times, in both directions, of less than a millisecond (with cooling time being somewhat longer than heating time) are currently realizable, and such times should be reducable to a few microseconds, or even into the nanosecond range, after more experience with fabrication.

Other transition metal compounds, which may be employed in forming the masking film structures 14 et seq. include other oxides of vanadium (vanadium oxide and divanadium trioxide) and silver sulfide. Organometallic complex compounds which may be used include silver tetracyanoquinone and copper tetracyanoquinone.

In FIG. 2 there is schematically depicted the masking structure layout for a modified embodiment of the improved masking device, designated by the reference numeral 50, in which square masking structures, including a central structure 52 and a plurality of outer structures 54, are carried by a major face of the substrate 12 in a grid or matrix-like arrangement. This arrangement of masking zones is particularly useful in certain applications of Hadamard transform techniques, involving the successive selection of different subsets of the "cells" of the masking grid. The device 50, as indicated by the use of similar reference numerals for similar parts, is constructed in the same manner as previously described for the device 10 of FIG. 1, except with regard to the mentioned difference in shape and arrangement of the masking structures 52 and 54 from the structures 14, et seq. of device 10 and the manner of effecting electrical connections with the structures 52 and 54 next discussed. It will be apparent from FIG. 2 that, in order to effect electrical connections with opposite extremities of each of the structures 52 and 54 for flow of electrical current therethrough, it is necessary for certain of such connections to be made at physical locations which are not conveniently adjacent an edge of the substrate 12. Accordingly, with the arrangement of the structures 52 and 54 in a grid layout, it is currently preferred to make the "inner" connections remote from the edges of the substrate 12 by means of lead wires 56 disposed along the slots 57 (which are formed by cutting at appropriate intervals in perpendicular directions and may need to be somewhat wider than the slots 15 et seq. of the device 10, in order to accommodate the wires 56) and to secure the same to the appropriate structure 52 or 54 by silver epoxy cement. The connection of the lead wires 36 with the structures 54 at points adjacent the edge of the substrate 12 may either be effected in similar manner or by a technique such as described for the device 10. With the new techniques being developed in the electronics industry for fabricating fine electrical conductors traversing narrow available paths, it may also be feasible to employ that technology for fabricating the leads 56 directly upon the substrate 12, with connections being made to the structures 52 and 54 in essentially the manner described for the device 10. It will be noted, regardless of the specific connection method used, that, as indicated in FIG. 2, only a single lead 56 need traverse each stretch of the slots 57.

In FIG. 3 there is illustrated another modified embodiment of the improved masking device, designated by the reference numeral 60, in which dual sets of masking film structures are carried on opposite faces of a common substrate and have their longitudinal extents disposed perpendicularly to each other to provide electrically alterable, grid or matrix cell masking. The common substrate 12 is of the same nature as described for the device 10, and the upper, hidden face 30 of the substrate 12 is provided with the same type of masking structures as described in connection with FIGS. 1 and 2 for the device 10, the orientation of which structures in the device 60 is indicated in FIG. 3 by the location of the electrical contacts 38 and the associated electrical leads 36. The other major face 61 of the substrate 12 in the device 60 is provided with a plurality of masking film structures 62, 64, 66, 68, 70, 72, and 74, which (along with separating slots as at 63 and the means 36' and 38' provided for effecting electrical connections therewith) are in all respects similar to the masking structures 14 et seq., except that the structures 62 et seq.

are oriented perpendicularly to the structures 14 et seq. to permit both X-axis and Y-axis control over the masking pattern configuration presented by the dual sets of masking zones defined cooperatives by the structures 14 et seq. and the structures 62 et seq.

Attention is next directed to the manner in which the improved masking devices provided by this invention may be employed in combination with other elements to provide improved spectroscopic apparatus. Those skilled in the art, especially in view of the preceding disclosures and discussion herein, will recognize that, not only is the improved masking device of the invention susceptible to various essentially equivalent constructions, but that the improved spectroscopic apparatus employing such masking devices is similarly adaptable to a variety of arrangments and constructions too numerous to permit or require exhaustive specific description herein. With regard to physical arrangements for the apparatus, the known conventional components and techniques for diverting the path of radiations and the known available freedom of designer's choice between the employment of transmissive or reflective components and between functionally equivalent types of particular components render it apparent that the improved apparatus contemplated by this invention can be implemented in many essentially equivalent ways. Accordingly, the consideration herein of possible implementations of the improved spectroscopic apparatus will be restricted to a limited number of illustrative examples described with reference to schematic representations thereof, in view of the familiarity of those skilled in the art with the various conventional components that may be involved and the relatively detailed description hereinabove of the improved masking devices constituting an essential element of the improved spectroscopic apparatus.

In FIG. 4, there is depicted a relatively simple arrangment, which may also be regarded as my currently preferred embodiment of spectroscopic apparatus according to the invention. Broadly, the numeral 100 indicates any kind of source of optical-type radiations to be analyzed by the apparatus, which is hereinafter broadly identified by the reference numeral 400. The curved arrows 102 represent radiations emanating from the source 100, either as direct radiations of the source 100, as radiations reflected from the source 100 or as radiations that have passed through or been reflected from a sample material (not shown). The radiations 102 will typically be diversely directed when received at the apparatus 400 and include radiations of all wavelengths produced by the source 100.

In the apparatus 400, the radiations 102 initially encounter beam restricting means 402 in the nature of a fixedly positioned slit plate type mask having an opaque plate 404 provided with a relatively narrow rectangular slot 406 therethrough. The slot 406 passes a restricted beam, indicated by the curved arrow 408, comprising a band of the radiations 102 that is quite narrow in one cross-sectional direction, but which includes radiations of all wavelengths present in the radiations 102 and received by the apparatus 400.

The beam of radiations 408 next encounters in the apparatus 400 spectral component separating means 410 in the nature of a diffraction grating 412, which disperses the radiation beam 408 into separate components according to wavelength, indicated by straight arrows 414, the directional paths of whose rays mutually diverge from each other by angles determined by the wavelengths of the radiations that are present. It is noted that, for convenience of illustration only, the diffraction grating 412 is shown as of the transmissive type, in order to permit the component in FIG. 4 to be depicted "in line"; however, in the actual construction of spectrometers, I prefer to employ a grating 412 of the reflective type, whenever the attendant change of direction imparted to radiations thereby is convenient or to employ a prism when "in line" construction is required.

The next element of the apparatus 400 encountered by the wavelength component radiations 414 is alterable masking means 416 in the nature of an improved masking device of the type provided by this invention and hereinbefore described in connection with FIG. 1. In the embodiment of FIG. 4, the apparatus 400 employs a masking device 416 of the type employing electrically alterable masking zones 422, 424, 426, 428 and 430 of parallel rectangular configuration having their longer dimension oriented in the same direction as the longer dimension of the bands 414 of wavelength component separated radiations. It is noted that only five of the zones 422 et seq. are illustrated for the device 416 (and for masking devices depicted in FIGS. 5 and 9) for simplicity of illustration in the drawings, but those skilled in the art will recognize that a different number of masking zones may be provided depending upon the mathematical analysis technique being employed and possibly other factors, as well as the fact that spectroscopic equipment employing Hadamard transforms will typically utilize arrangements of masking zones involving a number of zones equal to $4X-1$ along each dimension of intended discrimination or alteration. In FIG. 4, zones 422, 426 and 428 are depicted as in a transmissive state, while zones 424 and 430 are depicted as in an opaque state (indicated by cross-hatching). Opposite end portions 432 of the masking device 416 are also cross-hatched in FIG. 4 to indicate the opacity of the physical portions of the device 416 that are reserved for fixedly mounting the device 416 in the apparatus 400. An electrical cable having a plurality of conductors is represented at 434 and is electrically coupled with the masking device 416 as at 436 for selectively altering the masking characteristics of the device 416 in the manner hereinbefore explained and further referred to hereinafter. Assuming the masking configuration state depicted in FIG. 4, however, it will be observed that wavelength component radiations of the wavelengths represented by the middle and lower arrows 414 will be transmissively passed by the device 416, as depicted by the arrows 438, but that component radiations of the wavelength depicted by the upper arrow 416 will encounter the opaque zone 424 of the masking device 416 and be blocked.

Since the spectral elements or wavelength component radiations 438 passed by the masking device 416 will be angularly divergent, focusing means 440, such as a lens system 442 is provided for focusing the rays 438 as indicated by the arrows 444 prior to detection thereof.

The focused wavelength component radiations 444 are directed and applied to the radiation sensitive area 446 of radiation detection means 448, which operates to measure the aggregate intensity of all wavelength component radiations 444 being applied to it at a given time and to convert such aggregate intensity measurement int a corresponding electrical output signal (or an electrically sensible impedance parameter), which may be communicated to other electrical devices by means of an electrical cable 450 typically having a plurality of conductors electrically coupled with the detecting means as at 452. The radiation detecting means 448 may be any of a number of types and models of conventional radiation responsive transducers, frequently referred to as "photoelectric" detectors, with the choice of the specific detector component to be used typically and preferably being influenced by the region of the spectrum occupied by the wavelengths of the radiations of interest for particular constructions or applications of the spectroscopic apparatus.

The electrical signal or parameter representing the aggregate intensity of the wavelength component radiations 444 measured by the detecting means 448 is communicated via the electrical cable 450 to means 454 for appropriately utilizing such detected intensity data and for providing to the electrical cable 434 electrical signals for appropriately altering the masking pattern configuration of the masking means 416 whenever such alteration is called for in performing the spectroscopic analysis for which the apparatus 400 is being employed. In the embodiment of FIG. 4, the means 454 is assumed to be and schematically depicted as an appropriately programmed digital computer system having a data processing and computer control portion 456 and a control signal output portion 458, which it will be appreciated may represent more of a functional than a structural distinction within a typical computer system in which various structural parts may perform multiple functions. Typically and preferably, however, the data processing and internal control portion 456 of a computerized implementation of the means 454 will include means for providing an electrical interface with the intensity data input cable 450, means for decoding or performing any necessary conversion of the analog type intensity data received as an output into appropriate digital form, means for performing mathematical computations, memory means for storing input data, computational results, data to be output to peripheral display, recording or communications equipment and programs for controlling the operation of the various parts of the computer system itself to perform the desired spectroscopic analysis in accordance with a selected algorithm or technique such as Hadamard transforms, output interfacing means for communicating with external peripheral devices, and, desirably, a keyboard or other input control means by which an operator of the apparatus 400 may initiate, terminate or otherwise control the operation of the apparatus 400. Portion 458 of the computer system employed to implement the means 454 includes driver and interfacing means under the control of the primary computer portion 456 for supplying to the cable 434 at the appropriate times those electrical outputs required to alter the masking pattern configuration of the masking means 416. It will be understood that the programs embodied in the primary portion 456 of the computer means 454 will include information for controlling the operation of the mask configuration altering portion 458 with respect to both the specific subset of zones 422 et seq. to be electrically energized at each successive stage of the performance of the analysis algorithm or technique being used in the apparatus 400 and the times at which each such alteration of the masking pattern configuration is to occur (either in terms of fixed intervals of time or in response to the completion by the computer of a preceding segment of its programmed data pocessing operations).

As will be perceived, the combination of elements and relationships employed in the apparatus 400, as enhanced by the presence therein of the improved masking device 416, provides a relatively simple and extremely versatile spectroscopic analysis system, which is convenient to use and adapted to achieve significant improvements in accuracy and speed of operation, particularly when implemented to utilize the Hadamard transform technique for which the electrically alterable masking component 426 is especially suited.

In the embodiment of spectroscopic apparatus 500 schematically depicted in FIG. 5, elements which are the same as depicted and previously described in connection with the apparatus 400 of FIG. 4 are identified by the same reference numerals and will not be redescribed. In the apparatus 500, an electrically alterable masking device 516 is employed, which is in all respects similar to the masking device 416 of the apparatus 400, except that the masking device 516 is fixedly mounted in an angular orientation with respect to the median direction for the wavelength component radiations 414, in order to illustrate the simultaneous utilization of both the transmissive and reflective properties of the masking zones 522, 524, 526, 528 and 530. Such mode of operation of the masking device 516 permits an implementation of Hadamard transform techniques in which two subsets of wavelength component radiations can be simultaneously detected and processed by the computer component of the apparatus for purposes of improved reliability, accuracy and/or speed of operation.

Other than the changed orientation of the masking means 516, the portion of the apparatus 500 depicted in the upper part of FIG. 5 is essentially identical to that depicted and described in connection with the apparatus 400 of FIG. 4. Moreover, the operation of the transmissive state masking zones 522, 526 and 528 is the same as for the transmissive masking zones 422, 426 and 428, and it will be observed that the same wavelength component radiations 414 represented by the two lower arrows pass through the masking device 516 as pass through the masking device 416. However, the wavelength component radiations represented by the upper arrow 414, which were blocked by the opacity of the masking zone 424 in the apparatus 400, are reflected by the masking zone 524 of the masking means 516, as indicated by the arrow 538, in a direction permitting same to be utilized (whereas radiations reflecting from the zone 424 of the apparatus 400 were simply "wasted").

Although focusing means and detecting means could have been deployed directly along the median path for component wavelength radiations reflected from the masking device 516, a direction diverting mirror is illustrated as instead deployed along that path at an angular orientation appropriate for redirecting the component wavelength radiations 538 as indicated by the arrow 562. The apparatus 500 then includes a second focusing means 540 and a second detecting means 548 electrically coupled with the primary portion 456 of the computerized means 454 by an electrical cable 550, which are of the same nature and for the same purposes as described for the focusing means 440 and the detecting means 448, except that a different subset of wavelength component radiations is being processed. Since no change is required in the construction or operation of the masking means 516 (which is merely positioned in a different orientation than the masking means 416 in the apparatus 400), the additional focusing means 540 and detecting means 548 are relatively inexpensive components of the overall system, and the computerized data processing means 454 has no difficulty in accepting concurrent inputs from a pair of detecting means 448 and 548, it will be apparent to those skilled in the art that the arrangement utilized in the apparatus 500 provides further versatility and advantages in the practice of Hadamard transform spectroscopy employing an electrically alterable type masking means 516.

The embodiment of spectroscopic apparatus 600 schematically depicted in FIG. 6 is intended to illustrate certain additional constructional options, as well as the employment of electrically alterable masking means adjacent the entrance end of a spectroscope for selectively sampling different portions of the source radiations and the accomplishment of such electrically alterable masking by means of dual masking devices (which may be constructed either separately or upon a common substrate, as previously described). When alterable masking is to be employed adjacent the entrance, rather than fixed slit entrance masking, it will usually be desirable to employ optional radiation collimating means 652, such as a lens system 654, for altering the paths of the typically divergent radiations 102 from the source 100 into more parallel paths as indicated by the curved arrows 656. In this embodiment, the beam restricting means is implemented using at least one electrically alterable masking device 602 having horizontally extending rectangular masking zones 622, 624, 626, 628 and 630. If entrance masking that is to be alterable only along a Y-axis direction is to be employed, then the entrance masking means 602 may consist of merely a single masking device 616 of the kind shown in FIG. 1 and previously described for the masking device 416 of the apparatus 400, and no second entrance masking device would be used; similarly, if selectable grid cell masking is desired at the entrance restriction 602, the masking device 616 will preferably be of the kind shown and described in connection with FIG. 2; in either such case, the second mask 603 shown in FIG. 6 would be omitted. However, if dual entrance masking is to be employed in order to provide alterable masking along both the X-axis and the Y-axis in separate planes, as is illustrated in the apparatus 600 of FIG. 6, then a second electrically alterable masking means 603 having vertically extending masking zones 623, 625, 627, 629 and 631 will be used along with the mask 602. When the second masking means 603 is employed, it may be provided either by a separate masking device 617 identical to the masking device 416 of the apparatus 400 (each of the masks 602 and 603 being of the kind shown in FIG. 1) or may be the "other half" of a dual masking device of the type shown and described in connection with FIG. 3. In either case, when dual masking is employed, it will be apparent that the planes of the two masking faces will preferably be parallel (although their faces are depicted "head-on" for convenience of illustration and explanation in FIG. 6), and that the longitudinal extent of the masking zones 622 et seq. of the mask 616 will be oriented in perpendicular or other intersecting relationship to the longitudinal extent of the masking faces 623 et seq. of the mask 617. In FIG. 6, the masking zones are shown as relatively perpendicular in the two masks 616 and 617 (and only a single zone 624 of the mask 616 and a single zone 627 of the mask 617) are in a transmissive state, all of the other zones of both masks being rendered opaque by electrical energization thereof. In such masking pattern configuration, the dual mask arrangement 602-603 is shown as passing radiation through only a single square as at 658 of an available grid pattern from which any square or cell can be selected by electrically altering the identity of a single transmissive zone of each of the masks 616 and 617, although more typically a plurality of the masking zones 622 et seq. and 623 et seq. will be utilized to provide a more elaborate masking pattern. Radiations passing through the tranmissive cell 658 of the dual masking device 602-603 is indicated by the curved arrow 660. As will be apparent, when dual masking devices are employed, either as being restricting means adjacent the entrance of spectroscopic apparatus or for wavelength component selection prior to detection, selected groups consisting subsets of the masking zones upon each of the masks 616 and 617 may be selectively rendered transmissive or opaque, rather than merely a single masking zone of each half of a dual masking device, and it is also quite feasible to employ single masking devices both preceding and following the wavelength component separating means, with the two masking devices employing relatively perpendicular or otherwise intersecting rectangular masking zones to provide "grid scanning"; and those skilled in the art will recognize that such capabilities will be useful in implementing certain versions of the Hadamard transform and analogous techniques for spectroscopic analysis.

Returning attention to the specifics of the apparatus 600 illustrated in FIG. 6, the radiations 660 pass by the entrance masks 602-603 (or either of them if only a single masking device 616 or 617 is utilized) encounters a wavelength component separating means 610 in the nature of a reflective type diffraction grating 612 disposed at an angular orientation so that the dispersed wavelength component radiations indicated by the arrows 614 may be directed to an electrically alterable masking means 666, which is also illustrated as fixedly oriented at an angle to the median path of the imposed radiations in order to conveniently utilize the reflective mode of its alterable masking zones in the layout depicted. The rectangular masking zones of the device 666 are identified as 672, 674, 676, 678 and 680, of which zones 672, 674 and 678 are depicted as rendered reflective by electrical energization. The wavelength component radiations selected for reflection by the masking device 666 are indicated by the arrows 638 and are focused, detected, measured and fed to a computer by focusing means 440, detecting means 448, cable means 450 and computerized data receiving, processing and utilization means 454, which may all be as previously described for the correspondingly identified parts of the apparatus 400, except that, in addition to providing the electrical control signals for selectively altering the masking pattern configuration of the masking device 666 via the cable 450, the mask altering control portion 458 of the means 454 is, of course, also adapted to supply electrical outputs for altering the masking pattern of each of the masking devices 602 and 603 via electrical cables 682 and 684 respectively.

FIG. 7 illustrates the manner in which an electrically alterable masking device 716 may be employed in conjunction with a pair of angularly disposed mirrors 786 and 788 in the type of spectroscopic apparatus in which radiations to and from such masking device (and typically throughout the system) are directed along generally parallel paths. In such apparatus, curved mirrors (not shown) are employed at various points along the mentioned parallel radiation paths from an entrance mask to the wavelength component separator mask and back to a detector for measuring aggregate intensity disposed adjacent to the entrance mask. The general layouts for such systems, which lend themselves to compactness of construction, are already known to those skilled in the art and will not be further herein described. A contribution of this invention to such system arrangements arises from the manner in which the electrically alterable type masking devices provided, which require no mechanical repositioning for changing the masking pattern configuration thereof, render it possible to considerably simplify the constructions that heretofore were feasible for providing the mentioned type of radiation path arrangement. In the embodiment of FIG. 7 and as best shown in FIG. 8, the masking zone structures 622 et seq. of the masking device 716 longitudinally extend from left to right in FIG. 7, and it will be understood that dispersion of wavelength components by a preceding prism or grating (not shown) is toward and away from the viewer of FIG. 7. The device 716 is utilized in its transmission mode with its masking zones 624, 628 and 634 shown in a transmissive state and its masking zones 622, 626, 630 and 632 shown as energized into their opaque radiation blocking state, it being noted that any radiations reflected by the last-mentioned group of masking zones are merely "wasted" but do not interfere with radiations passed by the masking device 716 because of the offset between the generally parallel paths for the incoming and outgoing radiations. The path of an incoming component wavelength radiation being passed by the device 716 is indicated by the arrows 790. With the illustrated masking pattern configuration, the radiation wavelength component represented by the arrows 790 may be assumed to have been reflected by the mirror 786, passed by the transmissive masking zone 624 of device 716, and reflected by the mirror 788.

FIG. 9 represents an even simpler arrangement for accomplishing the same purposes as the apparatus for FIGS. 7 and 8 through the utilization of merely an electrically alterable masking device 816 fixedly positioned in preferably perpendicular, angular relationship to a mirror 818 and operated in its reflective mode. The masking zones 822, 826 and 830 of the masking device 816 are illustrated as in their transmissive state from absence of electrical energization thereof, while the masking zones 824 and 828 of the device 816 are shown as electrically energized and in their reflective state. A set of incoming wavelength component radiations are indicated by the arrows 890 and respectively directed toward the masking zones 822, 824 and 828 of the masking device 816. The radiations represented by the upper arrow 890 pass through the corresponding transmissive zone 822 of the masking device 816, while the wavelength component radiations represented by the middle and lower arrows 890 are reflected by the masking zones 824 and 828 of the device 816 toward the mirror 818 and reflected by the latter along a path indicated by the arrows 892.

Since the illustrative embodiments of spectroscopic apparatus thus far specifically described do not begin to exhaust the possible and useful constructions for such apparatus contemplated and rendered feasible by this invention, it may be appropriate to consider the relatively generic aspect of the improved spectroscopic apparatus in its relationship to conventional prior apparatus for the same general purpose, which, by more clearly revealing the nature of the more basic differences may also serve to facilitate full appreciation by those familiar with the art concerning the breadth of constructions and applications for which the invention is adapted.

Accordingly, reference is first made to FIG. 10, wherein the primary elements and relationships involved in conventional prior spectroscopic apparatus are depicted in block diagram form. Since the captions in the blocks render the same largely self-explanatory in view of the preceding disclosure and discussion, it will be necessary to further discuss ony those elements and relationships within prior art spectroscopic apparatus, which are reasonable for limitations and disadvantages thereof, and with respect to which spectroscopic apparatus according to this invention differs in a manner thereby overcoming such limitations and disadvantages of prior equipment and yielding additional benefits and improvements. The first elements and relationship that are of interest in such context are the beam restricting means 900, the possible mechanical altering means 902 associated therewith, and the mechanical (and typically manual) relationship therebetween indicated by the dotted line 904. In many prior types of apparatus of the involved general class, the beam restricting or "entrance mask" means 900 is not alterable and is typically implemented with a fixed masking plate of opaque material having a slit or other form of aperture therethrough, and, with those constructions, no means whatsoever for altering the beam restricting or entrance masking pattern has been required or provided. Other previously tried or proposed constructions are known, however, in which the beam restricting or entrance masking means 900 would be rendered alterable or/and shiftable by resort to mechanical expedience for effecting the alteration. More specifically, when mere shiftability of a fixed pattern entrance mask, such as a slit plate, was needed for admitting different cross-sectional portions of the source radiations, the mechanical implementation of such function involved shiftable mounting of the slit plate or other masking device for movement along at least one axis, together with some form of mechanical adjusting means for manually repositioning the masking plate at a different location. Because of the high precision that is required or desirable, the construction of suitable means for shiftably mounting and adjusting the entrance masking plate tended to be relatively expensive, and, of course, the time required to attempt to accomplish such adjustments with sufficient precision to avoid compromising the accuracy of results was highly burdensome and a significant limiting factor upon what could be accomplished during a given period of time with such apparatus. Where it was also desired to change the masking pattern configuration of the entrance beam restricting means, as is useful in some implementations of Hadamard transform and analogous techniques of analysis, the only known practical approach heretofore available involved providing a plurality of differentlypatterned masking plates which could be successively substituted for each other within some form of mounting structure for releasably holding the same. Again, considerations of precision and the necessity of manually changing masks rendered such approach less than satisfactory due to the manufacturing costs and time-consuming manual operations required.

The next elements and relationship of interest involved in prior spectroscopic apparatus were the alterable masking means 910 provided between the spectral or wavelength component separating means and the radiation detecting means or focusing means associated with the latter, the mechanical means 912 provided for altering the masking means 910, and the mechanical or/and relationship therebetween indicated in the diagram by the arrow 914. As distinguished from the entrance mask or beam restricting means 900, the masking means 910 between the component separating means and the radiation detecting means must be alterable in at least a positional sense in order for the apparatus to be utilized in performing a complete analysis of a given instance of source radiations, and, if Hadamard transform or similar techniques are to be employed, it is also highly desirable that the masking pattern configuration of the masking means 910 be changeable. Otherwise, however, the problems, attempted solutions and disadvantages of providing alterable masking means 910 in previously available equipment have been essentially identical to those just discussed with respect to the beam restricting means 900, which is only optionally of alterable character. With the masking means 910, however, the noted disadvantages of attempting to provide alterability by mechanical and/or manual means were essentially unavoidable in any practical spectroscopic apparatus.

Finally, attention is directed to the detected data utilization means 920 of previously available spectroscopic apparatus. It is, of course, now conventional to provide a digital computer system with the usual peripherals for receiving aggregate intensity data from a radiation detecting means, utilizing such data to compute spectral analysis results by means of the Hadamard transform or analogous mathematical techniques, and to appropriately display, record or communicate such results to a user, and it is also conventional to provide as a part of such computerized systems a keyboard or other means for exerting operator control over the computerized analysis process, which has heretofore been especially important for reasons shortly to be noted. In known prior spectroscopic apparatus, however, the means 920 essentially performed only the aforementioned functions and provided no assistance whatsoever with respect to altering the masking means 910 (and the entrance masking means 900, if the latter was to be alterable). As will be apparent from FIG. 10, no relationship between the computer system 920 and the masking means 910 or 900 is indicated, and none is known to have existed in spectroscopic apparatus heretofore available. Moreover, in such prior equipment, the mechanical and manual means employed to alter the masking means 910 and possibly also the entrance masking means 900 inherently required such periods of time for each mask alteration to be performed by the operator that the computer system 920 was essentially rendered idle, and its capacity for performing other useful work during such intervals negated. Thus, with known prior apparatus, either valuable computer capacity was wasted or the operator was required to utilize the control means 922 associated with the computerized means 920 to divert the latter to other tasks until the next of the successive mask alterations required in its spectroscopic analogous procedure could be completed by the operator with the mechanical means available for that purpose.

Figure 11:
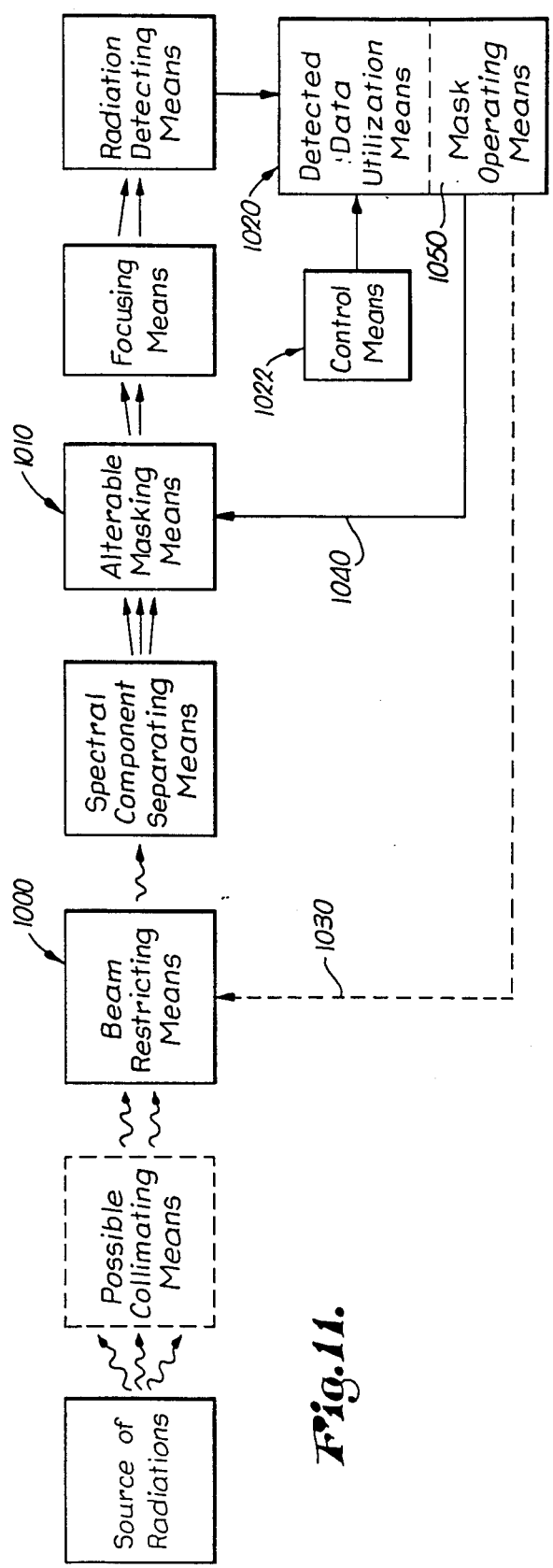
FIG. 11 is a block diagram broadly indicating the combinational elements and relationships involved in spectroscopic apparatus according to this invention.

In contrast with the prior apparatus discussed in connection with FIG. 10, FIG. 11 illustrates improved spectroscopic apparatus according to this invention in block diagram form, which is as similar to that employed in FIG. 10 as the differences therebetween will permit. Again, the conventional elements and relationships are believed to be essentially self-explanatory and discussion will be limited to the elements and differences which primarily account for the advantages of the improved apparatus provided by this invention. The desirability of alterability of the beam restricting or entrance masking means 1000 of the improved apparatus is essentially the same as hereinbefore described for the beam restricting or entrance masking means 900 of prior art devices, and the necessity for alterability of the masking means 1010 of the improved apparatus is the same as described for the masking means 910 of prior art apparatus. However, it will be noted that the mechanical altering means 902 and 912 and their mechanical and manual relationships 904 and 914 with the masking means 900 and 910 respectively in the prior art apparatus have been eliminated from the improved apparatus. In their stead, the improved apparatus requires and provides only electrical connections 1030 and 1040 to the masking means 1000 and 1010 respectively from a mask operating means 1050 provided as a part of the computerized system 1020 also used for data processing and utilization. This constructional and operational simplification and the very significant savings of time effected thereby are made possible by the fact that the masking means 1000 and 1010 employ an improved apparatus are of entirely different character than the masking means 900 and 910 employed in prior art apparatus. Whereas the masking means 900 and 910 were essentially of mechanical/optical nature, the masking means 1000 and 1010 are of the improved kind provided by this invention, as heretofore described, and are of electrical/optical character. The time required for selective alteration of the improved masking means 1000 and 1010, in either or both of what might be regarded as positional and pattern configuration changes, involve only a minute fraction of the times required for alteration by mechanical and manual means of the masking means 900 and 910 of prior art apparatus. Moreover, the fixedly mounted masking means 1000 and 1010 of the improved apparatus require no means for positional adjustment or the like and can be electrically altered at a speed compatible with the normal progress of performance of a spectroscopic analysis by the computerized system 1020, so that the successive alterations of the pattern configurations of the masking means 1000 and 1010 may be automatically invoked under the control of the computer system 1020, which needs merely to activate the mask operating means portion 1050 thereof for supplying the appropriate electrical exitations to the masking means 1000 and 1010 at the appropriate times. Accordingly, in the improved apparatus, the capacity of the computerized system 1020 is much more fully utilized and is required for a much shorter period of time for each analysis than was the case for the computerized system component 920 of prior apparatus, and the control means 1022 of the improved apparatus will typically be used only for initiating each analysis procedure and providing the computer system 1020 with any special directions that may be appropriate for selecting among available forms of outputting of results or the like; in fact, it will be apparent to those skilled in the art that the improved apparatus is adaptable for operating entirely under computer control and without human intervention in special applications or environments, such as in aerial surveillance.

From the preceding description and discussion of both aspects of this invention, it should be apparent to those skilled in the art that numerous minor modifications and equivalent versions of both the improved masking device and the improved spectroscopic apparatus embodying such device are available as a matter of designer's choice with regard to constructional details and the like, without department from the spirit and essence of this invention. It should also be apparent that individual aspects and portions of the invention may have separate utility, for instance, the employment of the improved electrically alterable masking device in applications involving optical-type radiations other than spectroscopic apparatus, as such. Accordingly, it is intended that the invention should be understood as limited only by the fair scope of the claims which follow, including a rasonable range of equivalents thereof.

I claim:

1. A radiation masking and redirecting assembly comprising:

an electrically alterable mask device including
substrate means presenting a pair of opposed faces and being relatively transmissive to radiations of selected wavelengths;
a plurality of solid, electrically conductive masking structures supported upon one face of said substrate means and being electrically insulated from each other; and
connector means electrically coupled with each of said masking structures respectively for connection of said respective structures with a source of electrical current for passage of electrical current through said masking structures as desired,
each of said masking structures being formed of a diachromatic material which can be selectively altered between a condition where it is relatively transmissive for said radiations, and a condition where it is substantially opaque and relatively reflective for said radiations, by changing the magnitude of electrical current passing through the structure; and
at least one mirror having a reflective surface diverging at a predetermined angle from said one face of said substrate means.

2. An assembly as set forth in claim 1, wherein is provided:
a second mirror having a reflective surface diverging at a predetermined angle from said one face of said substrate means,
said substrate means being disposed between said surfaces of said mirrors.

3. An assembly as set forth in claim 2, wherein:
said surfaces of said mirrors diverge from said one face of said substrate means by substantially equal angles.

4. An assembly as set forth in claim 3, wherein:
said surfaces of said mirrors are substantially perpendicular to each other.

5. An assembly as set forth in claim 1, wherein:
said surface of said one mirror and said one face of said substrate are substantially perpendicular to each other.

6. A spectrophotometer, comprising:
a source of radiation;
a stationary, fixedly mounted, electrooptical masking device including a body presenting a pair of opposed faces, zone-defining means carried by the body for dividing at least one of said faces into a plurality of discrete, selectively alterable zones;
means operably coupled with said body for selective, electrical alteration of each zone respectively between a condition where it is relatively transmissive for said radiation, and a condition where it is relatively opaque for said radiation,
said zone condition-altering means including means for successively and sequentially producing over the time of a single spectral analysis and in a predetermined fashion a number of different patterns of zones carried by the body which are rendered relatively transmissive and opaque, whereby different ones of said zones are predeterminedly rendered relatively transmissive and opaque at different times during said time of said single spectral analysis;
means for directing radiation from said source as continuous, unmodulated radiation onto a face of said masking device,
said zone condition-altering means being operable for passing of said radiation unmodulated through said zones when rendered relatively transmissive;
said radiation source and masking device being correlated such that the radiation from said source is of a wavelength which will pass unmodulated through the zones of said body when such zones are in said relatively transmissive condition;
detector means associated with said mask for successively and sequentially detecting certain of the radiation initially directed onto said one mask face during each predetermined mask pattern of relatively transmissive and opaque zones; and
means operably connected with said detector means for sucessively receiving and analyzing detected radiation information received from the detector means during each of said predetermined mask patterns, in order to provide a spectral analysis.

7. The spectrophotometer of claim 6, said radiation directing means including at least one mirror having a reflective surface adjacent said masking device and diverging at a predetermined angle from one of said faces of said device.

8. The spectrophotometer of claim 7, including a second mirror oriented at an angle with respect to said at least one mirror, said masking device being disposed between said mirrors.

9. The spectrophotometer of claim 6, said means for receiving and analyzing detected radiation information including a computer.

10. A spectrophotometer, comprising:
a source of radiation;
a stationary, fixedly mounted, electrooptical masking device including a body presenting a pair of opposed face, zone-defining means carried by the body for dividing at least one of said faces into a plurality of discrete, selectively alterably zones;
means operably coupled with said body for selective, electrical alteration of each zone respectively between a condition where it is relatively transmissive for said radiation, and a condition where it is relatively opaque for said radiation,
said zone condition-altering means including means for successively and sequentially changing over time in a predetermined fashion the pattern of zones carried by the body which are rendered relatively transmissive and opaque, whereby different ones of said zones are predeterminedly rendered relatively transmissive and opaque at different times during a given spectral analysis;

means for directing radiation from said source as continuous, unmodulated radiation onto a face of said masking device, said radiation source and masking device being correlated such that the radiation from said source is of a wavelength which will pass through the zones of said body when such zones are in said relatively transmissive condition;

detector means for successively and sequentially detecting certain of the radiation initially directed onto said one mask face during each predetermined mask pattern of relatively transmissive and opaque zones;

means operably connected with said detector means for successively receiving and analyzing detected radiation information received from the detector means during each of said predetermined mask patterns, in order to provide a spectral analysis; and said masking device comprising a substrate, said zone-defining means including a plurality of discrete structures formed of diachromatic material and supported by said substrate, there being respective electrical connector means operably coupled with each of said structures for selective application of electrical current thereto.

* * * * *